US012649642B1

(12) United States Patent
Crain, Jr.

(10) Patent No.: US 12,649,642 B1
(45) Date of Patent: Jun. 9, 2026

(54) VEHICULAR LIFT BRACKET

(71) Applicant: Richard D. Crain, Jr., Mellbourne, FL (US)

(72) Inventor: Richard D. Crain, Jr., Mellbourne, FL (US)

( * ) Notice: Subject to any disclaimer, the term of this patent is extended or adjusted under 35 U.S.C. 154(b) by 931 days.

(21) Appl. No.: 17/950,437

(22) Filed: Sep. 22, 2022

(51) Int. Cl.
*B66C 1/42* (2006.01)

(52) U.S. Cl.
CPC .................................... *B66C 1/42* (2013.01)

(58) Field of Classification Search
CPC .. B66C 1/42; B66C 1/422; B66C 1/10; E05B 45/12
See application file for complete search history.

(56) References Cited

U.S. PATENT DOCUMENTS

| | | | | |
|---|---|---|---|---|
| 1,056,780 | A | 3/1913 | Deacon et al. | |
| 4,445,665 | A | 5/1984 | Cray | |
| D348,134 | S | 6/1994 | McCanse et al. | |
| 5,486,083 | A | 1/1996 | Thompson | |
| 6,105,934 | A | 8/2000 | Rober | |
| 7,195,106 | B2 | 3/2007 | Heynssens | |
| 7,455,306 | B2 * | 11/2008 | Ramsey | B60G 9/003 280/124.128 |
| 7,997,387 | B2 | 8/2011 | Rauch et al. | |
| 8,141,851 | B2 | 3/2012 | Manev et al. | |
| 8,556,311 | B1 | 10/2013 | Lucero | |

FOREIGN PATENT DOCUMENTS

| | | | | |
|---|---|---|---|---|
| DE | 4412681 C2 * | 10/1997 | | E04G 21/22 |
| WO | WO-2013079756 A1 * | 6/2013 | | B60G 11/465 |

* cited by examiner

*Primary Examiner* — Gene O Crawford
*Assistant Examiner* — Sydney Jeanine Simmons
(74) *Attorney, Agent, or Firm* — Cramer Patent & Design, PLLC.; Aaron R. Cramer

(57) ABSTRACT

The present invention is directed to a vehicular lift bracket. The vehicular lift bracket may comprise a bracket that may couple to the underside of a frame of a vehicle to provide a level lifting surface for a vehicle lift. The brackets may be used in pairs such that a first bracket may couple to the left side of the frame and a second bracket may couple to the right side of the frame to provide symmetric lifting surfaces. The brackets may be coupled to the front half of the frame, the rear half of the frame, or both. A bottom plate of the bracket may be horizontally-oriented such that an individual lift pad of the vehicle lift may press up against the bottom plate to lift the vehicle.

3 Claims, 16 Drawing Sheets

VEHICULAR LIFT BRACKET

RELATED APPLICATIONS

None

FIELD OF THE INVENTION

The present invention relates generally to a lift bracket and more specifically to a lift bracket for a vehicle.

BACKGROUND OF THE INVENTION

As anyone who performs a lot of mechanical work will attest, nothing beats having the proper tool for a job. The proper tool can save time, save money, produce a higher quality job, reduce damage to equipment, and provide for the increased safety of the worker. Each field of mechanical work has its own type of specialty tools, each performing a specialized task. One tool common to many repair or maintenance tasks performed on motor vehicles is that of the vehicle lift. These lifts use movable arms that are placed beneath the frame to lift the vehicle.

However, the frames on many vehicles, such as pickup trucks and vans, are routed at an angle where the lift arms are capable of reaching. This means that the contact surface area between the arm and the frame is very small. Many people may also use blocks to assist, but their use may allow the vehicle to slip sideways on the lift. Accordingly, there exists a need for a means by which vehicles with angled frames can be safely lifted via a vehicle lift in an effort to address the safety concerns as listed above. The development of the vehicular lift bracket fulfills this need.

SUMMARY OF THE INVENTION

The principles of the present invention provide for a vehicular lift bracket that has a bracket adapted to couple to an underside of a frame of a vehicle, a plurality of bracket plates having a bottom plate, a first side plate, a second side plate, and a top plate, and an internal support reinforcing the bracket plates for strength. The bracket is adapted to provide a level lifting surface for a vehicle lift, and the bracket is used in pairs such that a first bracket is adapted to couple to a first side of the frame and a second bracket is adapted to couple to a second side of the frame to provide a symmetric lifting surface.

The brackets may be coupled to a first half of the frame and a second half of the frame. The brackets may be coupled to the first half of the frame or the second half of the frame. The bottom plate of the bracket may be horizontally-oriented such that an individual lift pad of the vehicle lift presses up against the bottom plate to lift the vehicle. The bottom of the first side plate may be coupled to a first longitudinal end of the bottom plate. The bottom of the second side plate may be coupled to a second longitudinal end of the bottom plate. The top of the first side plate may be coupled to a first longitudinal end of the top plate. The top of the second side plate may be coupled to a second longitudinal end of the top plate. The top plate may be held at an oblique orientation such that the orientation of the top plate matches the orientation of the frame at an individual angled frame section. The top plate may include a plurality of mounting apertures.

The top plate may be coupled to the frame using a plurality of mounting hardware that passes through the mounting apertures and through a plurality of corresponding apertures adapted to be drilled into the frame of the vehicle. The mounting hardware may be selected from the group consisting of a plurality of bolts, a plurality of nuts, a plurality of flat washers, a plurality of lock washers, or any combination thereof. The bracket plates may be coupled together to form a convex quadrilateral. The lateral width of the bottom plate, the first side plate, the second side plate, and the top plate may be equal. The bracket plates may be oriented such that a straight line drawn laterally across a lateral width of any of the bracket plates are horizontally oriented. The internal support may include one or more structural elements that couple to at least the top plate and the bottom plate to reinforce the bracket. The internal support may include a support panel that a vertically oriented panel that couples to the top plate, the bottom plate, the first side plate, and the second side plate. The support panel may include a plurality of weight reduction apertures that pass through the support panel in a direction that is normal to the support panel. The internal support may include one or more web plates coupled to the top plate and to the bottom plate. The top plate may include a gap to prevent mechanical interference between the bracket and one or more other components that are coupled to the frame.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
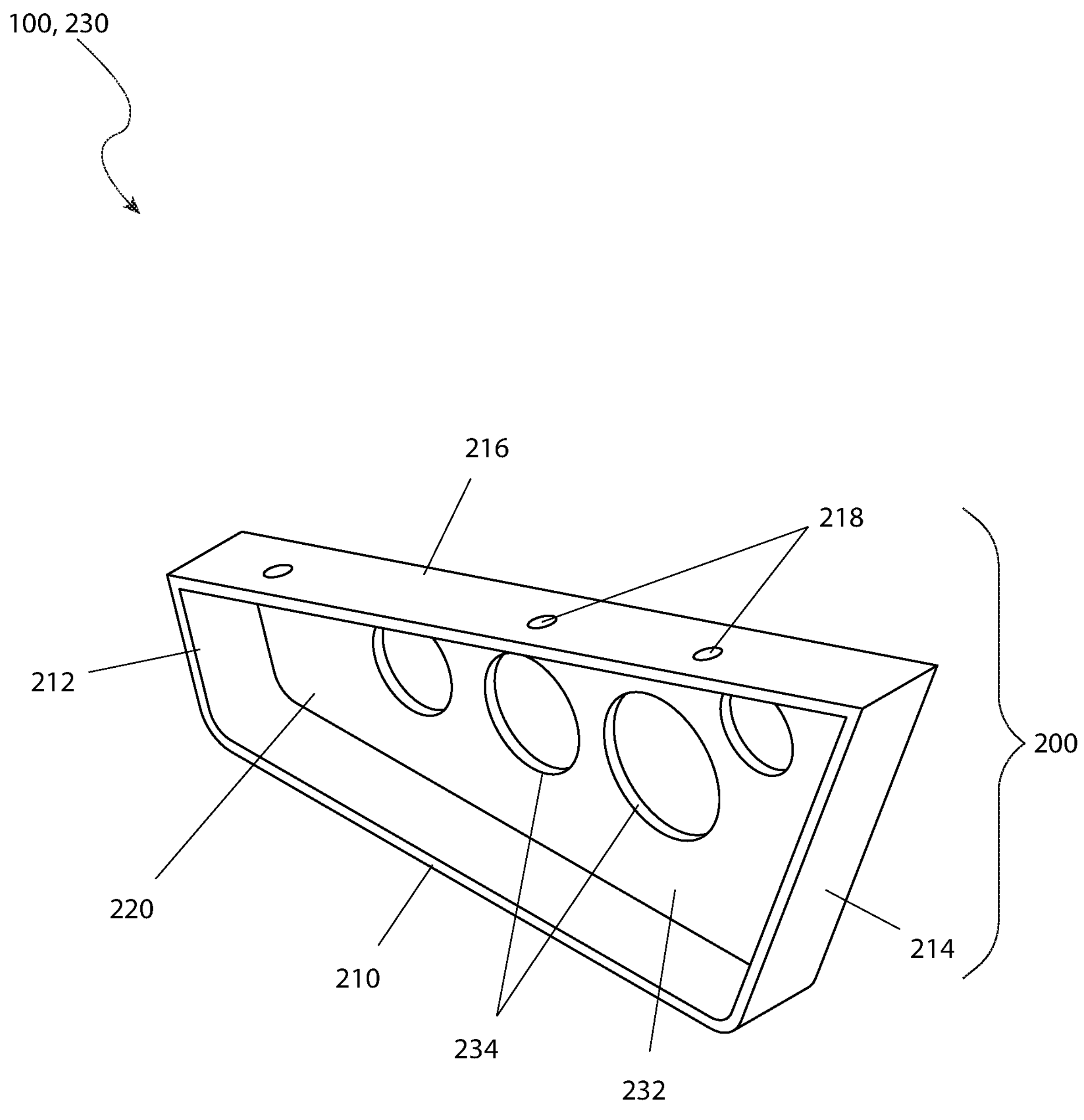
FIG. 1 is an isometric view of a vehicular lift bracket, according to a first embodiment of the present invention.
Figure 2:
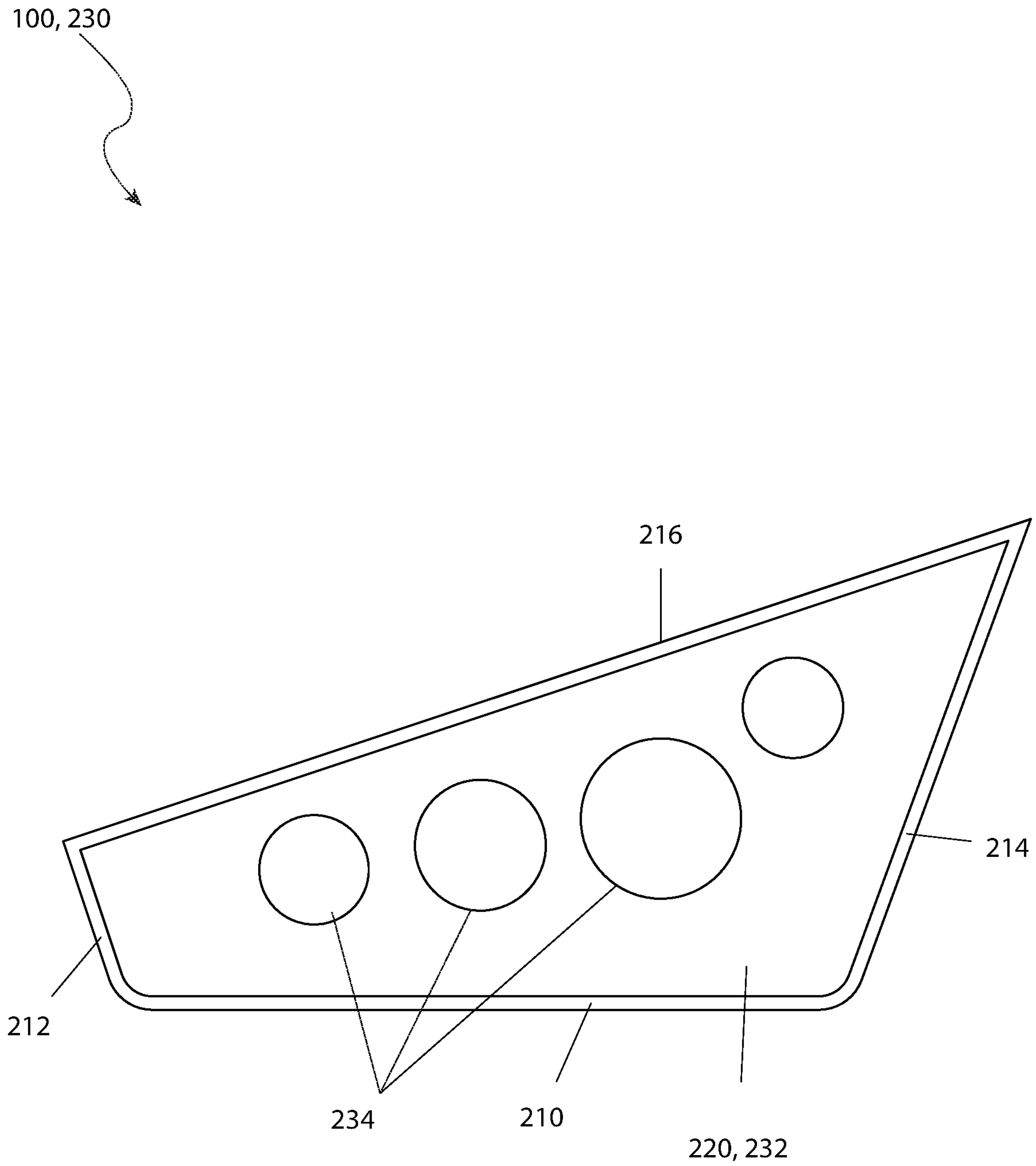
FIG. 2 is a left side view of a vehicular lift bracket, according to a first embodiment of the present invention.
Figure 3:
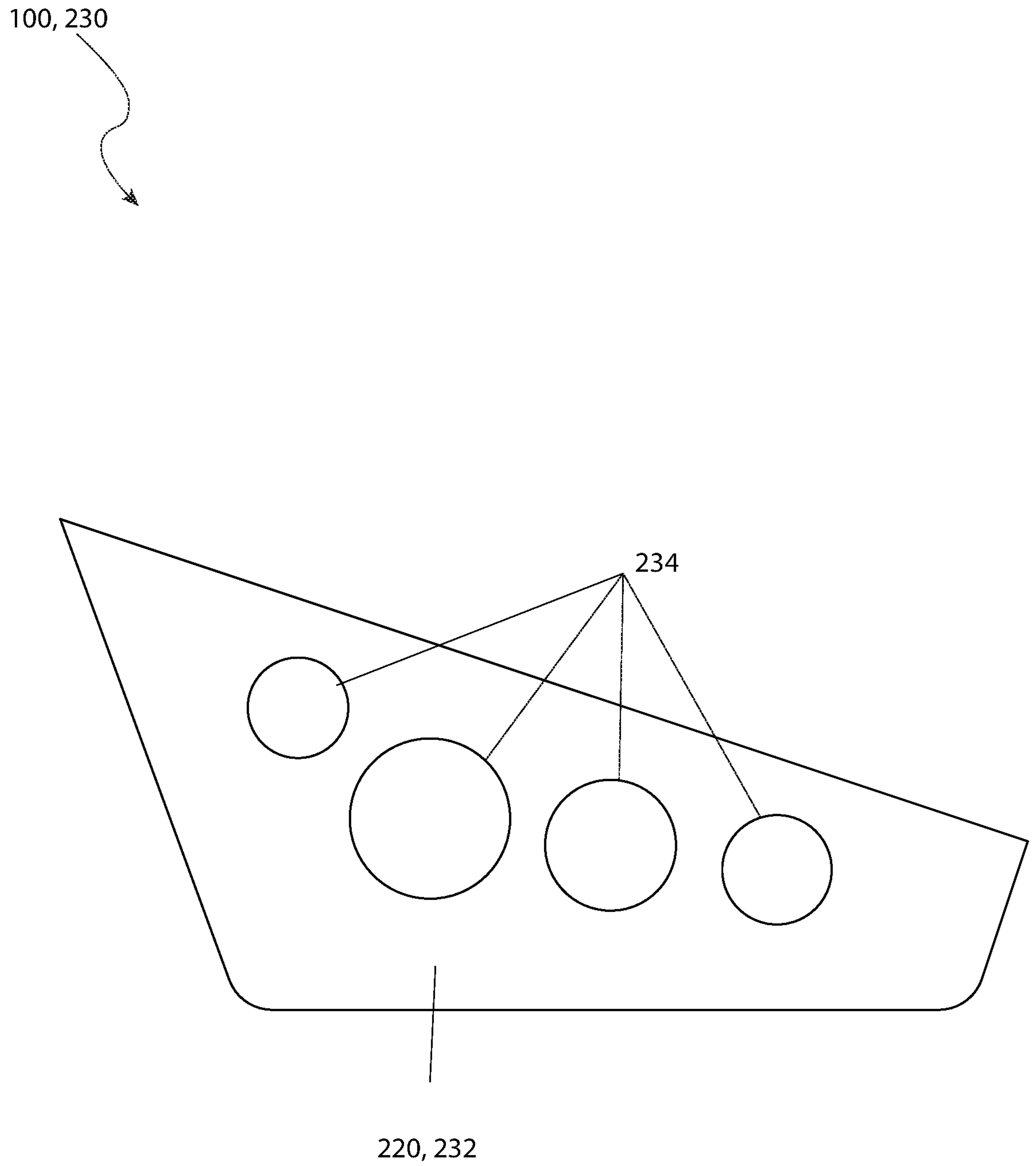
FIG. 3 is a right side view of a vehicular lift bracket, according to a first embodiment of the present invention.
Figure 4:
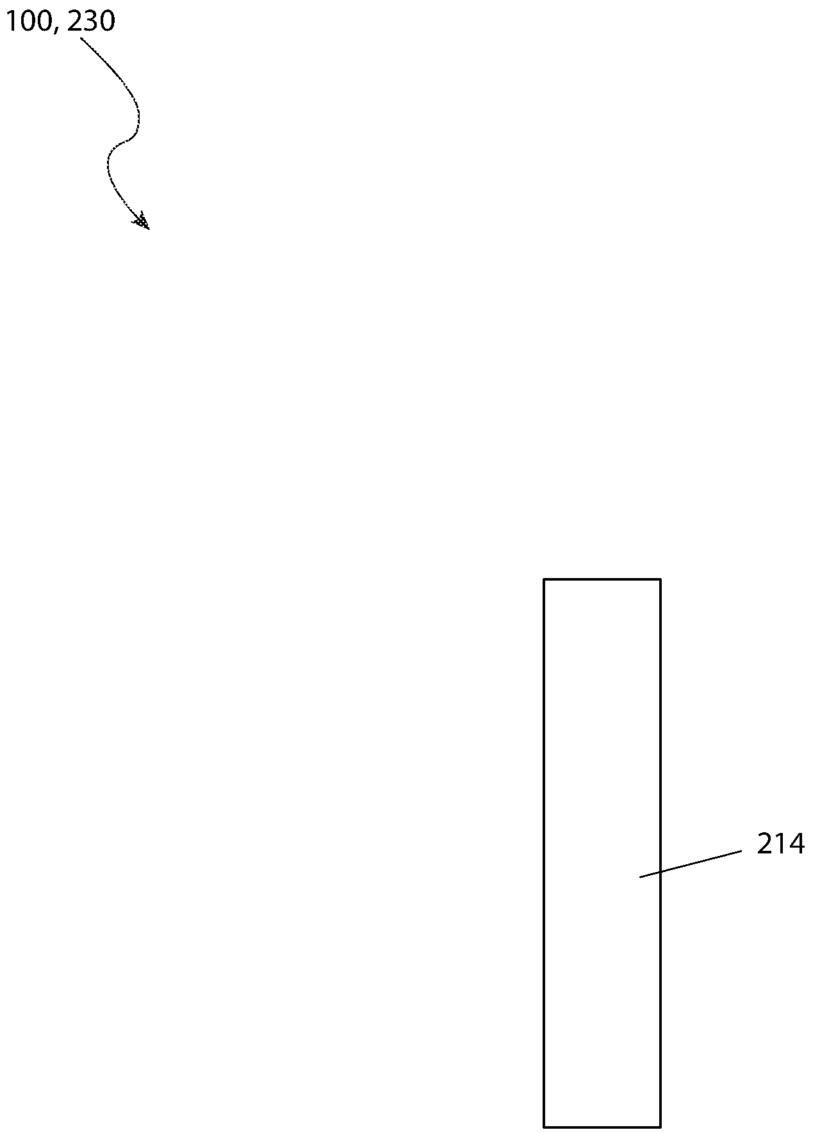
FIG. 4 is a front view of a vehicular lift bracket, according to a first embodiment of the present invention.
Figure 5:
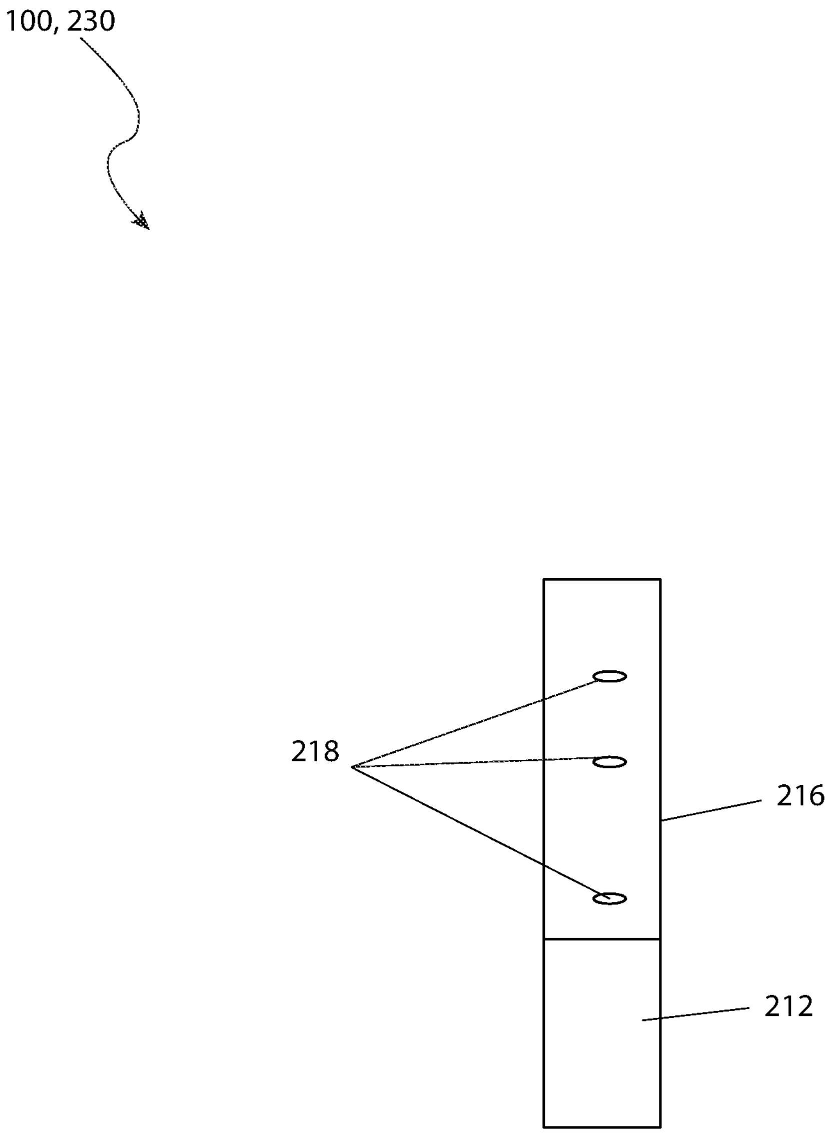
FIG. 5 is a rear view of a vehicular lift bracket, according to a first embodiment of the present invention.
Figure 6:
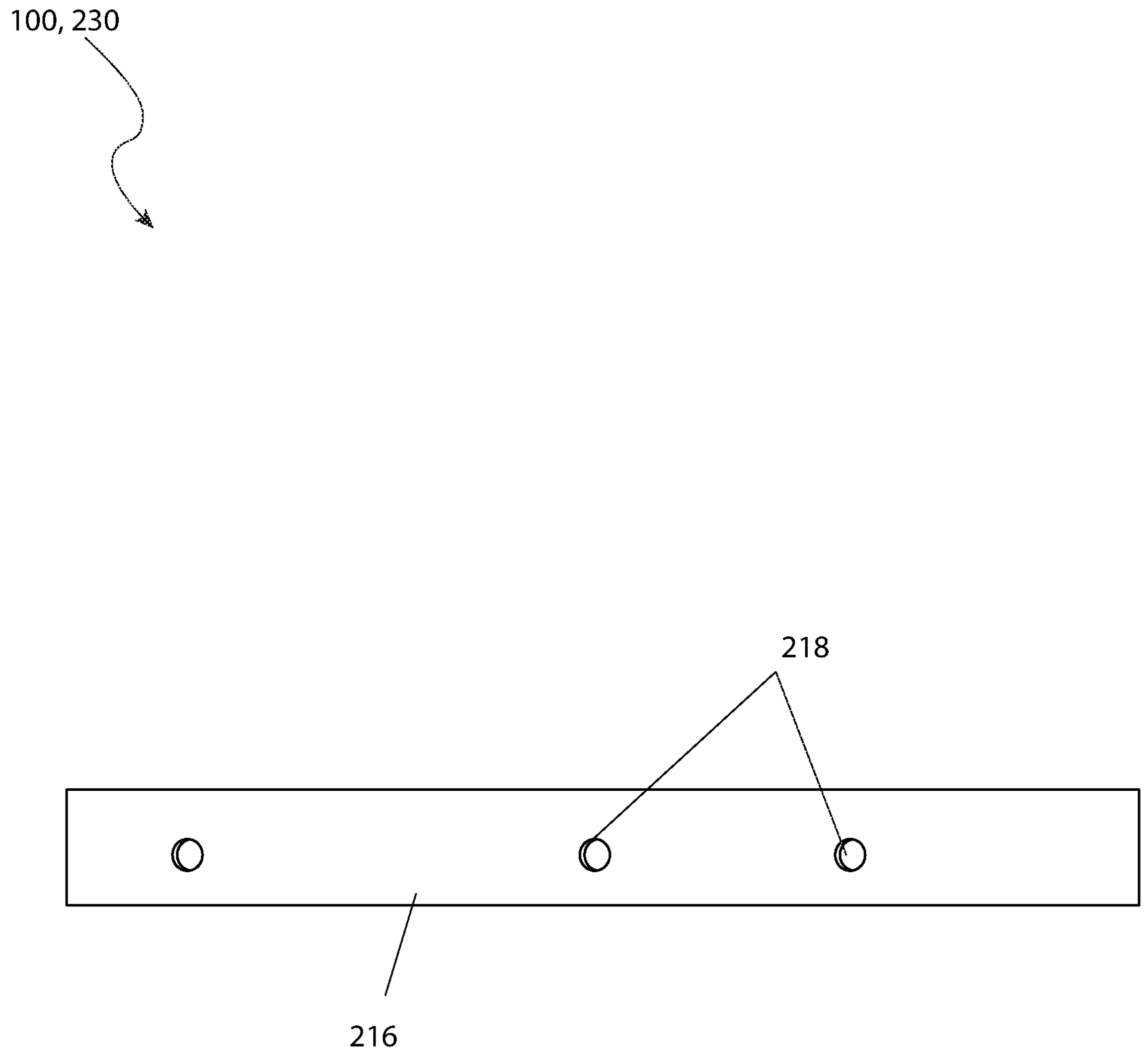
FIG. 6 is a top view of a vehicular lift bracket, according to a first embodiment of the present invention.
Figure 7:
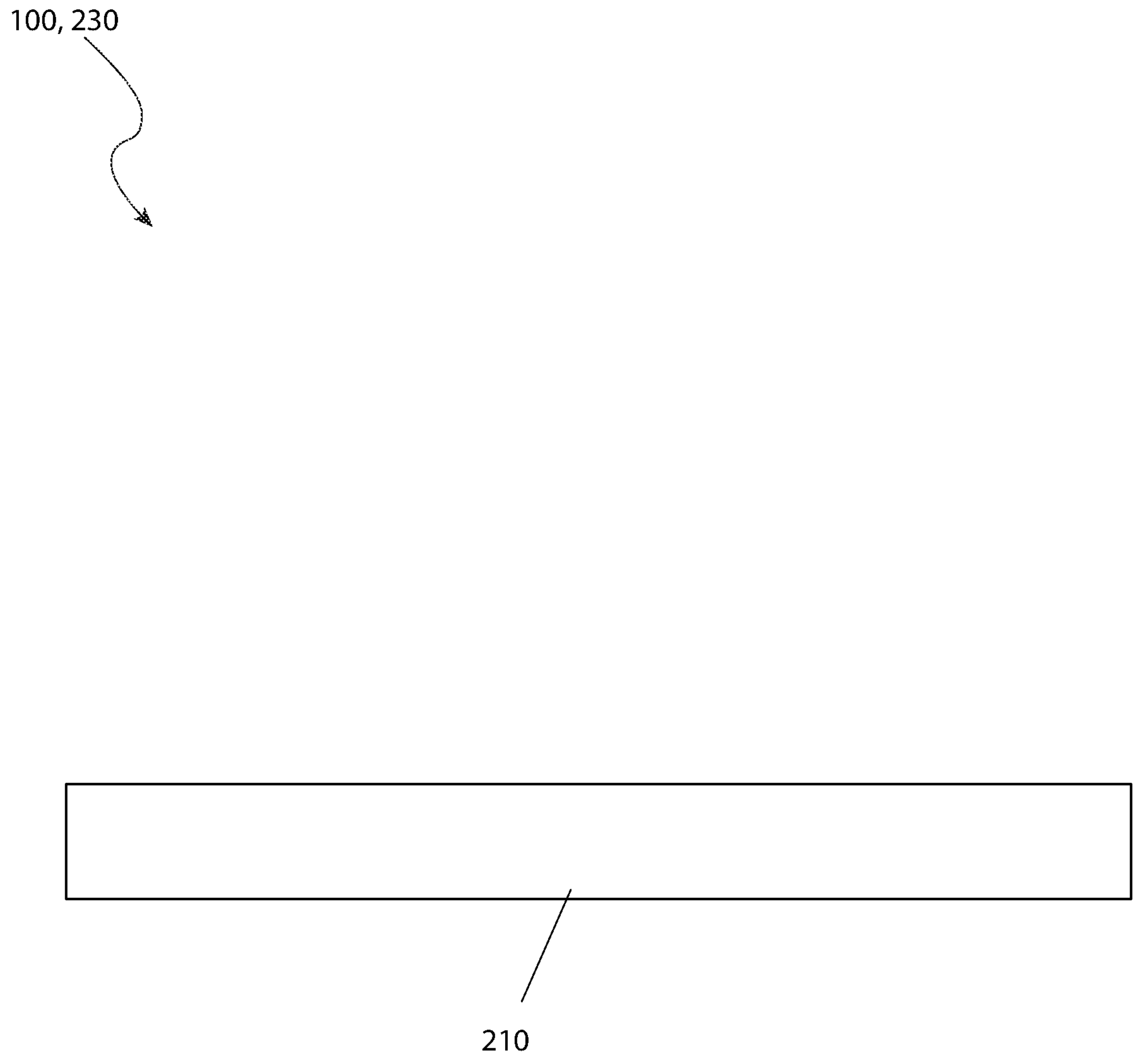
FIG. 7 is a bottom view of a vehicular lift bracket, according to a first embodiment of the present invention.
Figure 8:
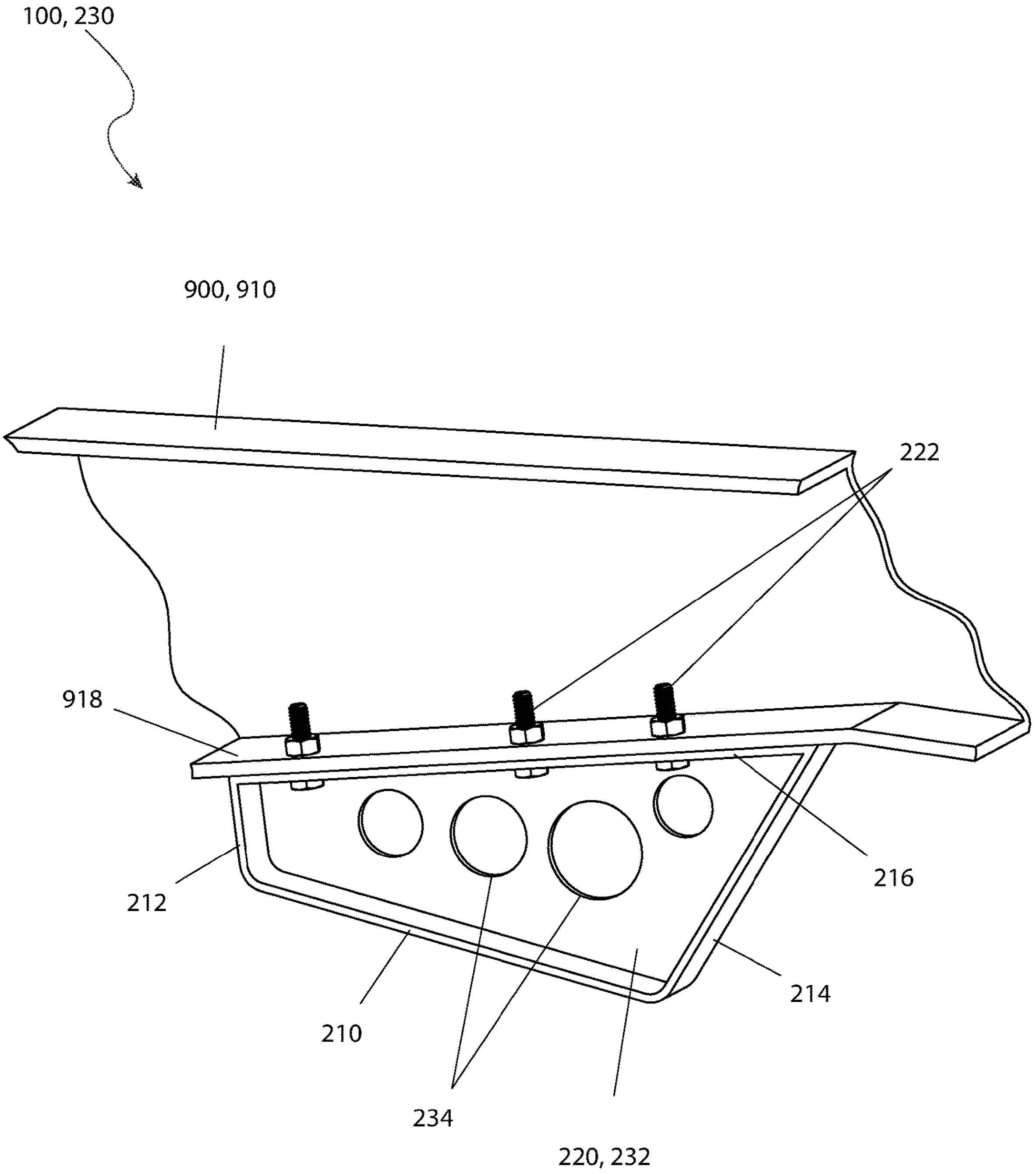
FIG. 8 is an in-use view of a vehicular lift bracket, according to a first embodiment of the present invention.
Figure 9:
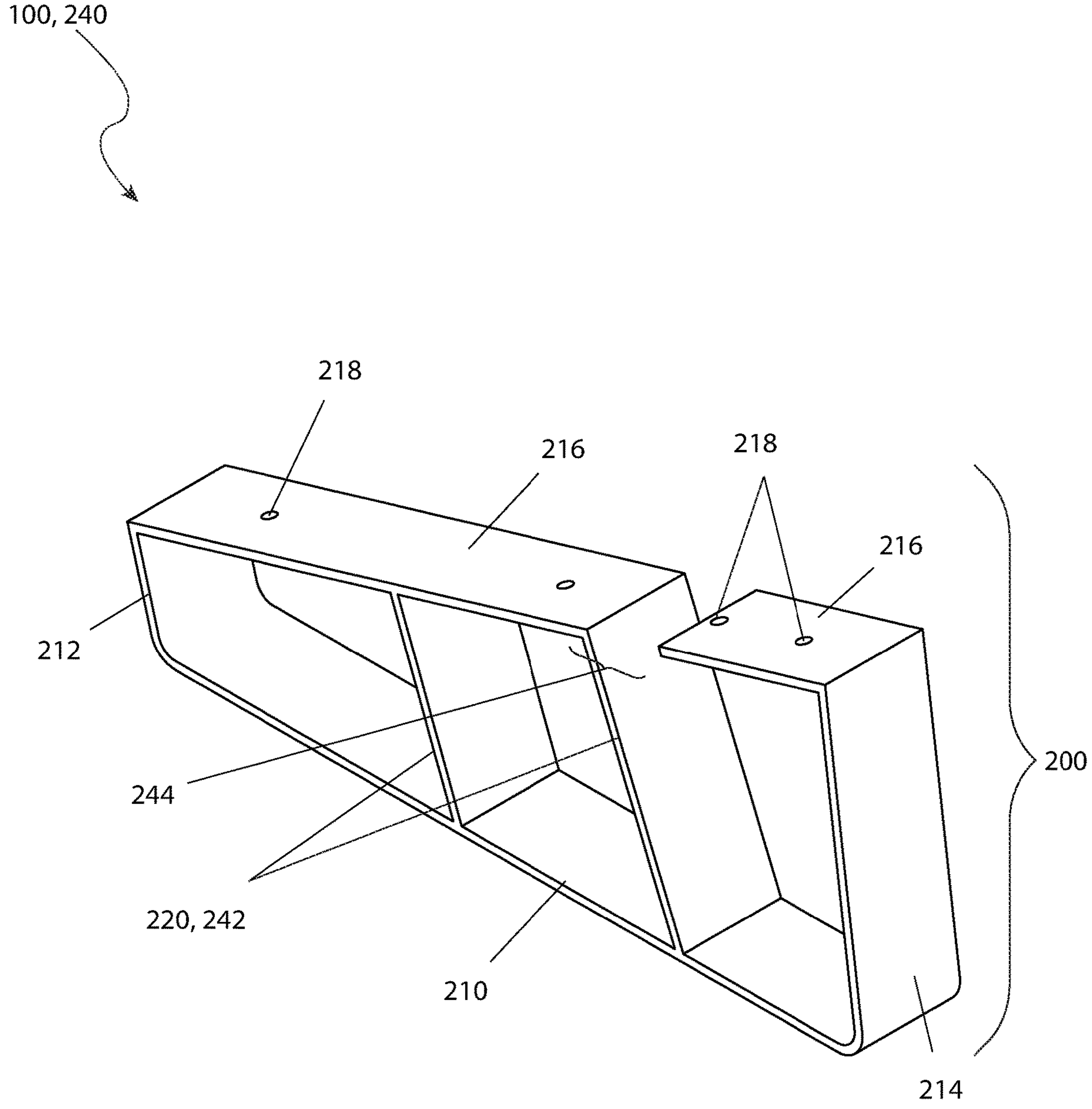
FIG. 9 is an isometric view of a vehicular lift bracket, according to a second embodiment of the present invention.
Figure 10:
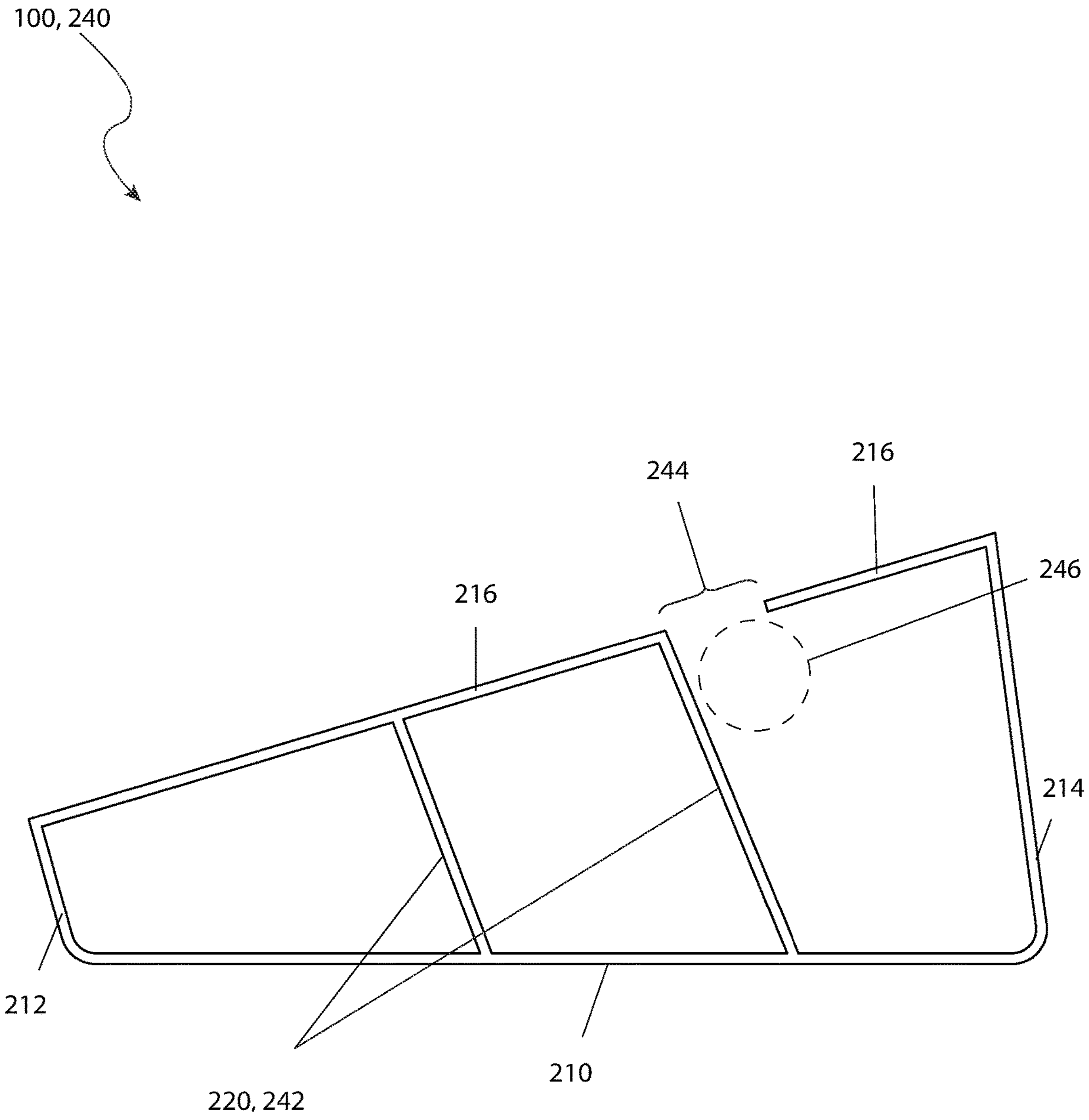
FIG. 10 is a left side view of a vehicular lift bracket, according to a second embodiment of the present invention.
Figure 11:
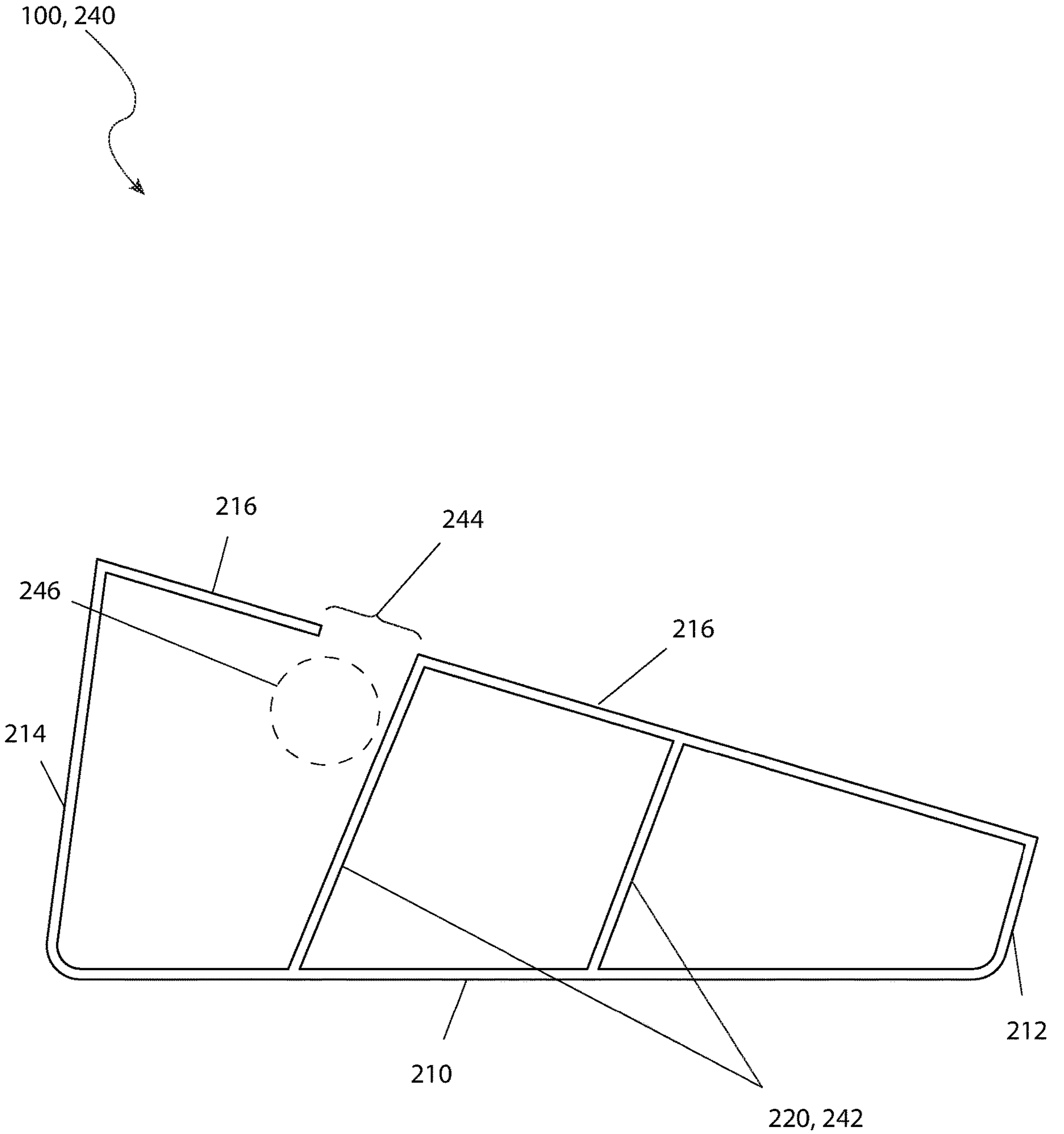
FIG. 11 is a right side view of a vehicular lift bracket, according to a second embodiment of the present invention.
Figure 12:
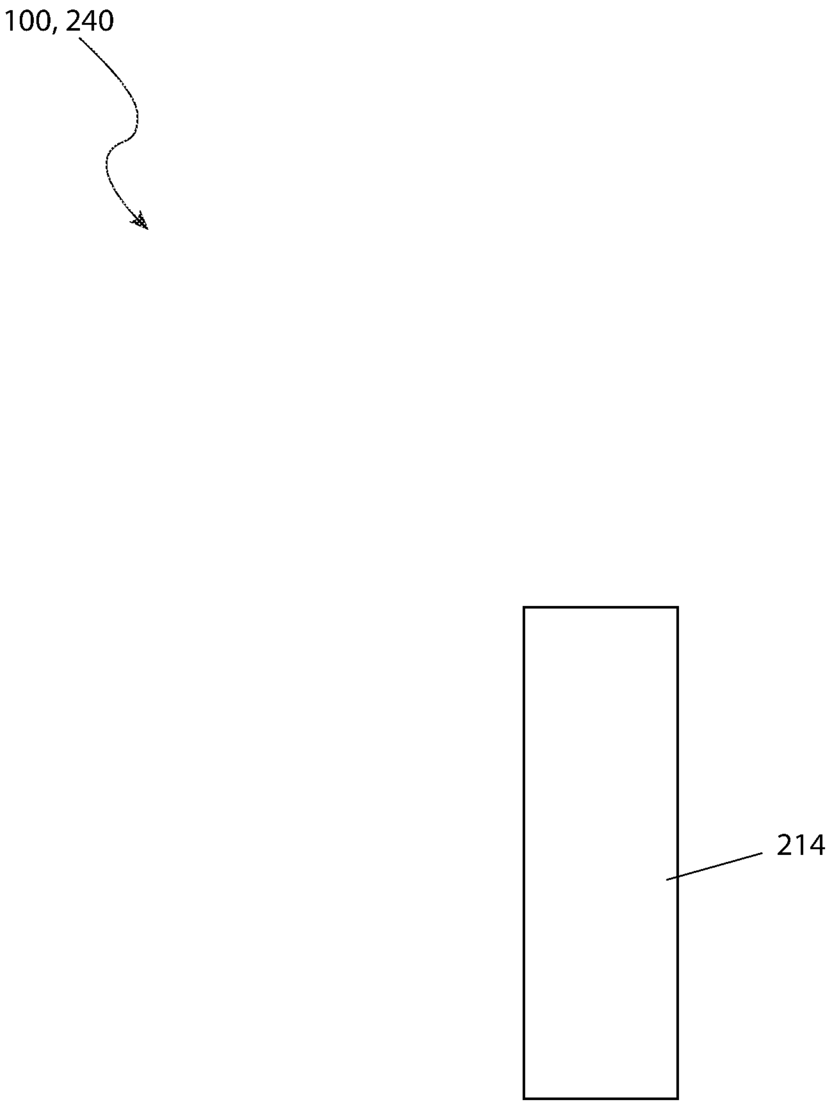
FIG. 12 is a front view of a vehicular lift bracket, according to a second embodiment of the present invention.
Figure 13:
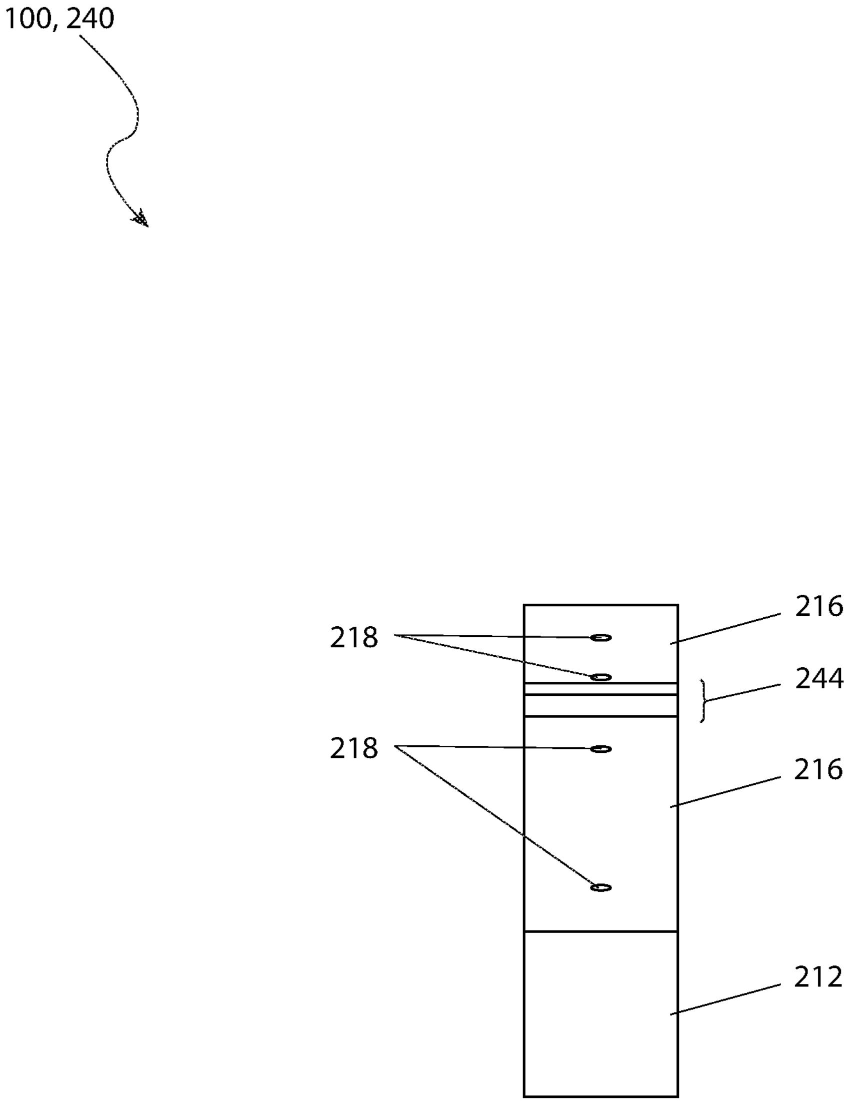
FIG. 13 is a rear view of a vehicular lift bracket, according to a second embodiment of the present invention.
Figure 14:
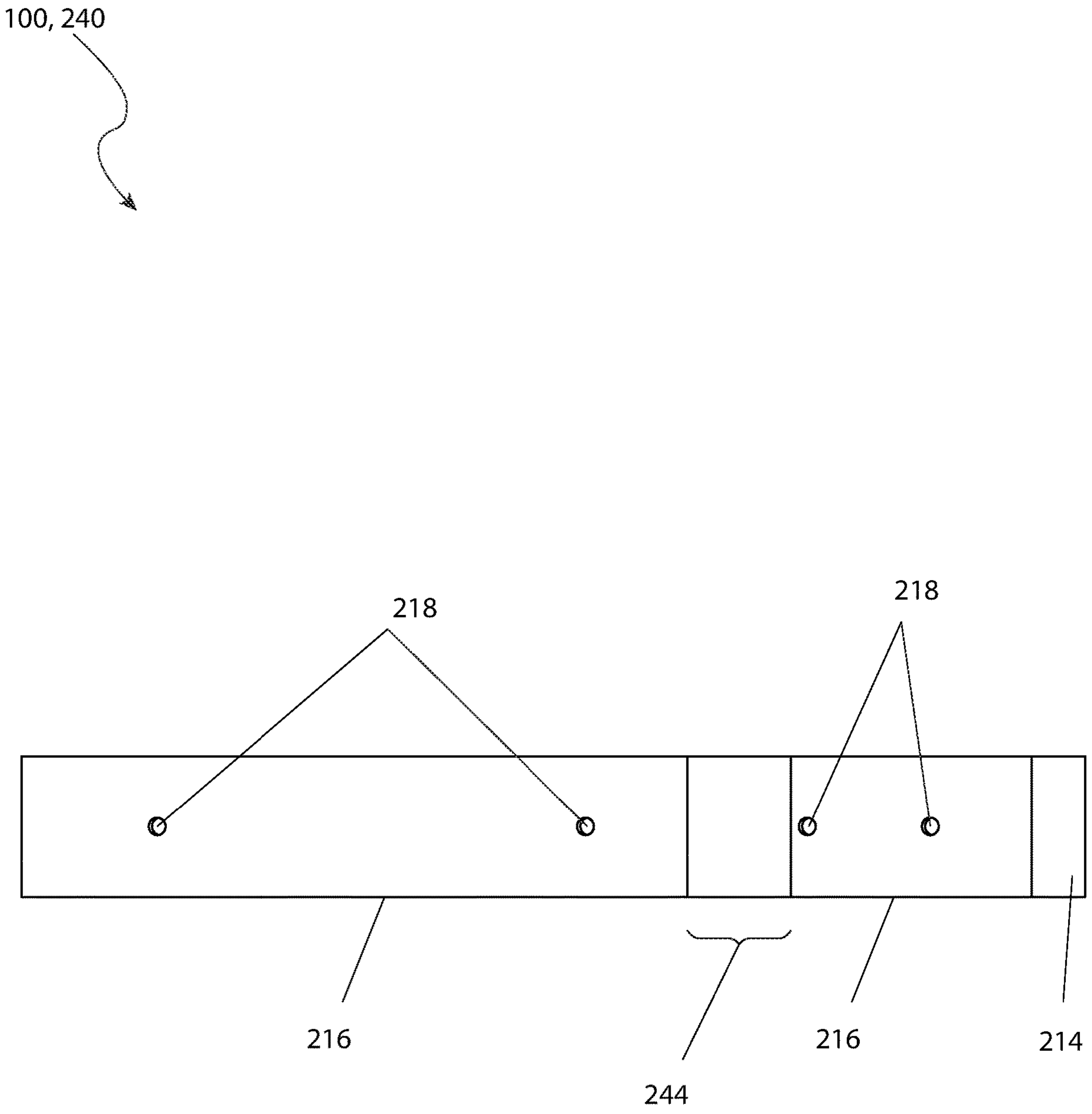
FIG. 14 is a top view of a vehicular lift bracket, according to a second embodiment of the present invention.
Figure 15:
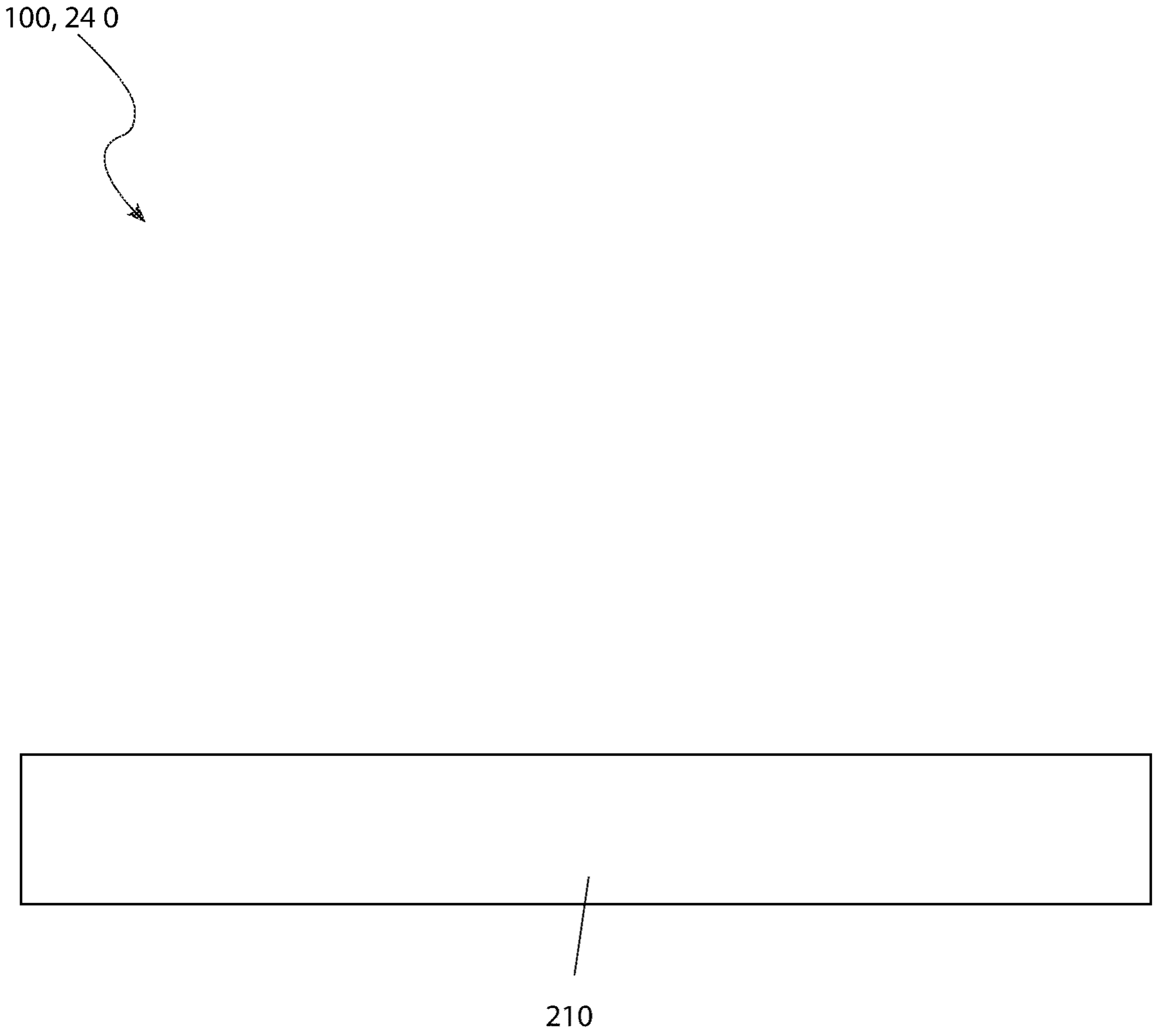
FIG. 15 is a bottom view of a vehicular lift bracket, according to a second embodiment of the present invention.
Figure 16:
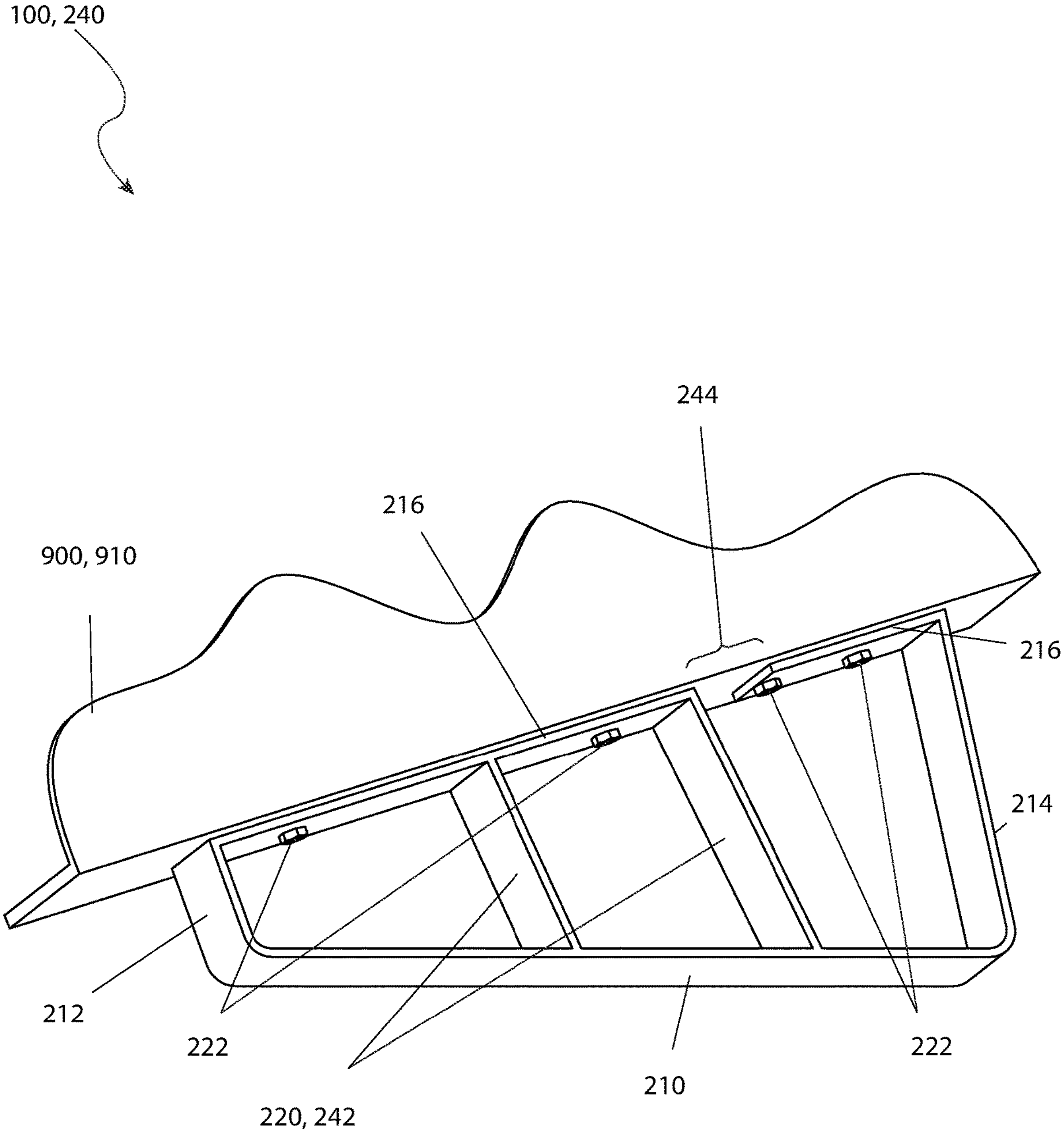
FIG. 16 is an in-use view of a vehicular lift bracket, according to a second embodiment of the present invention.

100 vehicular lift bracket
200 bracket

210 bottom plate
212 first side plate
214 second side plate
216 top plate
218 mounting aperture
220 internal support
222 mounting hardware
230 first embodiment
232 support panel
234 weight reduction apertures
240 second embodiment
242 web plate
244 gap
246 void
900 vehicle
910 frame
918 individual angled frame section

1. DESCRIPTION OF THE INVENTION

The present invention is directed to a vehicular lift bracket (herein described as the "invention") 100. The invention 100 may comprise a bracket 200 that may couple to the underside of a frame 910 of a vehicle 900 to provide a level lifting surface for a vehicle lift. The brackets 200 may be used in pairs such that a first bracket may couple to the left side of the frame 910 and a second bracket may couple to the right side of the frame 910 to provide symmetric lifting surfaces. The brackets 200 may be coupled to the front half of the frame 910, the rear half of the frame 910, or both. A bottom plate 210 of the bracket 200 may be horizontally-oriented such that an individual lift pad of the vehicle lift may press up against the bottom plate 210 to lift the vehicle 900.

The vehicle lift may lift the vehicle 900 off of the ground such that mechanical work may be performed on the wheels or underside of the vehicle 900. As a non-limiting example, the vehicle lift may be a two-post vehicle lift comprising a pair of lift posts and a pair of lift heads that are hydraulicly raised and lowered along the pair of lift posts. A plurality of lift arms may extend under the vehicle 900 from the pair of lift heads. As a non-limiting example, a pair of left lift arms may extend under the left side of the vehicle 900 and a pair of right lift arms may extend under the right side of the vehicle 900. A plurality of lifting pads located at each end of the plurality of lift arms may press upwards against the frame 910 of the vehicle 900 to lift the vehicle 900.

The frame 910 may comprise one (1) or more horizontal frame sections and one (1) or more angled frame sections 918. The plurality of lifting pads may be positioned under the one (1) or more horizontal frame sections but not under the one (1) or more angled frame sections 918. Individual lift arms may pivot at the pair of lift heads to allow the plurality of lifting pads to be positioned under the one (1) or more horizontal frame sections. However, repositioning the plurality of lifting pads may necessitate pivoting the individual lift arms towards the center of the frame 910 which reduces the stability of the vehicle 900 while the vehicle 900 is being lifted. The brackets 200 may provide a level surface under the one (1) or more angled frame sections, such that the plurality of lifting pads may be positioned under the one (1) or more angled frame sections 918 for greater stability.

The bracket 200 may comprise a plurality of bracket plates and an internal support 220. The plurality of bracket plates may comprise the perimeter of the bracket 200. The internal support 220 may reinforce the plurality of bracket plates for strength.

The plurality of bracket plates may comprise the bottom plate 210, a first side plate 212, a second side plate 214, and a top plate 216. The plurality of bracket plates may be coupled to form a convex quadrilateral. The lateral width of the bottom plate 210, the first side plate 212, the second side plate 214, and the top plate 216 may be the same. The plurality of bracket plates may be oriented such that a straight line drawn laterally across the shortest dimension of any of the plurality of bracket plates is horizontally oriented.

The bottom plate 210 may be horizontally oriented such that the bottom plate 210 provides a level surface for the individual lift pad to press against. The bottom of the first side plate 212 may be coupled to a first longitudinal end of the bottom plate 210. The bottom of the second side plate 214 may be coupled to a second longitudinal end of the bottom plate 210. The top of the first side plate 212 may be coupled to a first longitudinal end of the top plate 216. The top of the second side plate 214 may be coupled to a second longitudinal end of the top plate 216.

The top plate 216 may be held at an oblique orientation with respect to horizontal such that the orientation of the top plate 216 matches the orientation of the frame 910 at an individual angled frame section 918.

The top plate 216 may comprise a plurality of mounting apertures 218. The top plate 216 may be coupled to the frame 910 using a mounting hardware 222 that may pass through the plurality of mounting apertures 218 and through corresponding apertures drilled into the frame 910 of the vehicle 900. As a non-limiting example, the mounting hardware 222 may comprise bolts, nuts, flat washers, lock washers, or any combination thereof.

The internal support 220 may be one (1) or more structural elements that couple to at least the top plate 216 and the bottom plate 210 to reinforce the bracket 200.

In a first embodiment 230, the internal support 220 may comprise a support panel 232. The support panel 232 may be a vertically oriented panel that couples to the top plate 216, the bottom plate 210, the first side plate 212, and the second side plate 214. The support panel 232 may be oriented to be perpendicular to the top plate 216, the bottom plate 210, the first side plate 212, and the second side plate 214. The support panel 232 may couple to the interior side of the top plate 216 along the entire longitudinal length of the top plate 216. The support panel 232 may couple to the interior side of the bottom plate 210 along the entire longitudinal length of the bottom plate 210. The support panel 232 may couple to the interior side of the first side plate 212 along the entire longitudinal length of the first side plate 212. The support panel 232 may couple to the interior side of the second side plate 214 along the entire longitudinal length of the second side plate 214.

In some embodiments, the support panel 232 may comprise weight reduction apertures 234 that may pass through the support panel 232 in a direction that is normal to the support panel 232. The weight reduction apertures 234 may reduce the weight of the bracket 200 by removing material from the support panel 232 without significantly weakening the bracket 200.

In a second embodiment 240, the internal support 220 may comprise one (1) or more web plates 242. The web plates 242 may be one (1) or more plates coupled to the top plate 216 and to the bottom plate 210. The lateral width of the web plates 242 may be the same as the lateral width of the plurality of bracket plates. The web plates 242 may be oriented such that a straight line drawn laterally across the shortest dimension of any of the web plates 242 is horizontally oriented.

In some embodiments, the top plate 216 may comprise a gap 244. The gap 244 may prevent mechanical interference between the bracket 200 and other components that may be coupled to the frame 910. The two (2) sections of the top plate 216 that are created by the gap 244 may be held in a coplanar orientation by the first side plate 212, the second side plate 214, the one or more web plates 242, the bottom plate 210, or any combination thereof.

As a non-limiting example, the gap 244 may be associated with a void 246 under the gap 244. The void 246 may be an area of the bracket 200 that is free of material such that a portion of the frame 910 or components that may be coupled to the frame 910 may extend downwards without mechanical interference from the bracket 200.

In a preferred embodiment, the plurality of bracket plates and the one or more web plates 242 may be made from one-quarter of an inch (¼ in.) steel and the support panel 232 may be made from one-eighth of an inch (⅛ in.) steel.

In some embodiments, the invention 100 may be available as a family of brackets having dimensions to match a specific year, make, and model of the vehicle 900. The family of brackets may also comprise different dimensions to match the front half of the vehicle 900 versus the rear half of the vehicle 900 if the orientation of the one or more angled frame sections of the frame 910 are different at the front or the rear. The family of brackets may be necessitated by varying size constraints and orientation angles for the top plate 216 due to different year/make/model and/or different locations under the vehicle 900.

In use, the brackets 200 may be selected for the front of the vehicle 900, the rear of the vehicle 900, or both based upon the year, make, and model of the vehicle 900. The brackets 200 may be coupled to the one (1) or more angled frame sections by drilling holes in the frame 910 to match the hole pattern on the top plate 216 of the brackets 200 and by securely coupling the brackets 200 to the frame 910 using the mounting hardware 222. With the brackets 200 in place, the vehicle 900 may be lifted by the vehicle lift by positioning each of the plurality of lifting pads under one or the brackets 200 or under the one (1) or more horizontal frame sections and then activating the vehicle lift.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vehicular lift bracket, comprising:

a bracket configured to couple to an underside of a frame of a vehicle to provide a level lifting surface for a vehicle lift, the bracket being used in pairs such that a first bracket couples to a first side of the frame and a second bracket couples to a second side of the frame to provide a symmetric lifting surface;

a plurality of bracket plates comprising a bottom plate, a first side plate, a second side plate, and a top plate, wherein a lateral width of the bottom plate, a lateral width of the first side plate, a lateral width of the second side plate, and a lateral width of the top plate are equal, and wherein each of the plurality of bracket plates is oriented such that a straight line drawn laterally across the lateral width of that bracket plate is horizontally oriented;

wherein a bottom of the first side plate is coupled to a first longitudinal end of the bottom plate, a bottom of the second side plate is coupled to a second longitudinal end of the bottom plate, a top of the first side plate is coupled to a first longitudinal end of the top plate, and a top of the second side plate is coupled to a second longitudinal end of the top plate, such that the plurality of bracket plates are coupled together to form a convex quadrilateral;

wherein the top plate is held at an oblique orientation with respect to horizontal such that the orientation of the top plate matches the orientation of the frame at an individual angled frame section of the frame, the top plate comprising a plurality of mounting apertures through which a plurality of mounting hardware passes to couple the bracket to the frame; and, an internal support comprising a support panel, wherein the support panel is a vertically oriented panel that is coupled to an interior surface of the top plate, an interior surface of the bottom plate, an interior surface of the first side plate, and an interior surface of the second side plate so as to reinforce the bracket, and wherein the support panel comprises a plurality of weight reduction apertures that pass through the support panel in a direction normal to the support panel.

2. A vehicular lift bracket, comprising:

a bracket configured to couple to an underside of a frame of a vehicle to provide a level lifting surface for a vehicle lift, the bracket being used in pairs such that a first bracket couples to a first side of the frame and a second bracket couples to a second side of the frame to provide a symmetric lifting surface;

a plurality of bracket plates comprising a bottom plate, a first side plate, a second side plate, and a top plate, wherein a lateral width of the bottom plate, a lateral width of the first side plate, a lateral width of the second side plate, and a lateral width of the top plate are equal;

wherein a bottom of the first side plate is coupled to a first longitudinal end of the bottom plate, a bottom of the second side plate is coupled to a second longitudinal end of the bottom plate, a top of the first side plate is coupled to a first longitudinal end of the top plate, and a top of the second side plate is coupled to a second longitudinal end of the top plate, such that the plurality of bracket plates are coupled together to form a convex quadrilateral;

wherein the top plate is held at an oblique orientation with respect to horizontal such that the orientation of the top plate matches the orientation of the frame at an individual angled frame section of the frame, the top plate comprising a plurality of mounting apertures through which a plurality of mounting hardware passes to couple the bracket to the frame;

an internal support comprising one or more web plates, wherein the one or more web plates are coupled to an interior surface of the top plate and to an interior surface of the bottom plate to reinforce the bracket; and, wherein the top plate comprises a gap that divides the top plate into two sections, the two sections being held in a coplanar orientation by the one or more web plates, the gap preventing mechanical interference between the bracket and one or more components coupled to the frame, and wherein a void is defined beneath the gap such that a portion of the frame or a component coupled to the frame may extend downward through the gap and into the void without mechanical interference from the bracket.

3. The vehicular lift bracket of claim 1, wherein the plurality of bracket plates are fabricated from steel plate having a thickness of one-quarter of an inch (¼ in.), and wherein the support panel is fabricated from steel plate having a thickness of one-eighth of an inch (⅛ in.).

* * * * *